(12) United States Patent
Park

(10) Patent No.: US 7,595,859 B2
(45) Date of Patent: Sep. 29, 2009

(54) LIQUID CRYSTAL DISPLAY DEVICE AND METHOD OF FABRICATING THE SAME

(75) Inventor: Yong In Park, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 282 days.

(21) Appl. No.: 11/166,091

(22) Filed: Jun. 27, 2005

(65) Prior Publication Data
US 2006/0146244 A1     Jul. 6, 2006

(30) Foreign Application Priority Data
Dec. 31, 2004   (KR) ..................... 10-2004-0118561

(51) Int. Cl.
*G02F 1/1339*     (2006.01)
(52) U.S. Cl. .................... 349/190; 349/139; 349/42
(58) Field of Classification Search ............... None
See application file for complete search history.

(56) References Cited

U.S. PATENT DOCUMENTS

| | | | |
|---|---|---|---|
| 5,663,575 A * | 9/1997 | Yamamura et al. ............ 257/59 |
| 6,195,140 B1 * | 2/2001 | Kubo et al. .................... 349/44 |
| 6,275,273 B1 * | 8/2001 | Inoue .......................... 349/40 |
| 6,288,764 B1 * | 9/2001 | Zhang et al. ................ 349/152 |
| 6,403,409 B1 | 6/2002 | You |
| 6,466,294 B1 * | 10/2002 | Yamagishi et al. .......... 349/155 |
| 6,480,255 B2 * | 11/2002 | Hoshino et al. ............. 349/149 |
| 6,567,147 B1 * | 5/2003 | Hirakata .................... 349/153 |
| 6,617,203 B2 | 9/2003 | Kim et al. |
| 6,753,235 B2 | 6/2004 | So et al. |
| 6,960,484 B2 | 11/2005 | Yoo et al. |
| 2001/0003657 A1 | 6/2001 | Lee |
| 2002/0000881 A1 | 1/2002 | Kusunoki |
| 2003/0193054 A1 * | 10/2003 | Hayakawa et al. ............ 257/72 |
| 2004/0196228 A1 | 10/2004 | Ahn |

FOREIGN PATENT DOCUMENTS

| | | |
|---|---|---|
| CN | 1326180 | 12/2001 |
| JP | 4-324826 | 11/1992 |
| JP | 11-167123 | 6/1999 |
| JP | 2000-47259 | 2/2000 |
| JP | 2000-231345 | 8/2000 |
| JP | 2000-275676 | 10/2000 |
| JP | 2004-118215 | 4/2004 |
| JP | 2004-133489 | 4/2004 |
| KR | 97-003717 B1 | 3/1997 |
| KR | 97-008589 B1 | 5/1997 |
| KR | 97-011966 B1 | 8/1997 |
| KR | 0161461 B1 | 8/1998 |
| KR | 0175408 B1 | 11/1998 |
| KR | 0177785 B1 | 11/1998 |

(Continued)

*Primary Examiner*—David Nelms
*Assistant Examiner*—Lucy P Chien
(74) *Attorney, Agent, or Firm*—McKenna Long & Aldridge

(57) ABSTRACT

A poly-silicon liquid crystal display and a simplified method of fabricating the same are disclosed. A liquid crystal display device according to the present invention includes first and second substrates having a display region and a driver region; a first sealant overlapping the driver region; and a liquid crystal layer between the first and second substrates.

17 Claims, 16 Drawing Sheets

FOREIGN PATENT DOCUMENTS

| | | |
|---|---|---|
| KR | 0184509 B1 | 12/1998 |
| KR | 10-0192593 B1 | 1/1999 |
| KR | 2000-0025565 | 5/2000 |
| KR | 2000-0026894 | 5/2000 |
| KR | 2000-0026895 | 5/2000 |
| KR | 2000-0031451 | 6/2000 |
| KR | 2000-0041223 | 7/2000 |
| KR | 2000-0075031 | 12/2000 |
| KR | 2001-019665 | 3/2001 |
| KR | 2001-0019668 | 3/2001 |
| KR | 10-0297706 | 5/2001 |
| KR | 2001-0054739 | 7/2001 |
| KR | 2001-0055071 | 7/2001 |
| KR | 2001-0056037 | 7/2001 |
| KR | 2001-0110917 | 12/2001 |
| KR | 2002-0009188 | 2/2002 |
| KR | 2002-0022258 | 3/2002 |
| KR | 2002-0071061 | 9/2002 |
| KR | 2002-0071062 | 9/2002 |
| KR | 2002-0074897 | 10/2002 |
| KR | 2002-0078116 | 10/2002 |
| KR | 2002-0079196 | 10/2002 |
| KR | 2002-0080202 | 10/2002 |
| KR | 2003-0006619 | 1/2003 |
| KR | 2003-0030286 | 4/2003 |

* cited by examiner

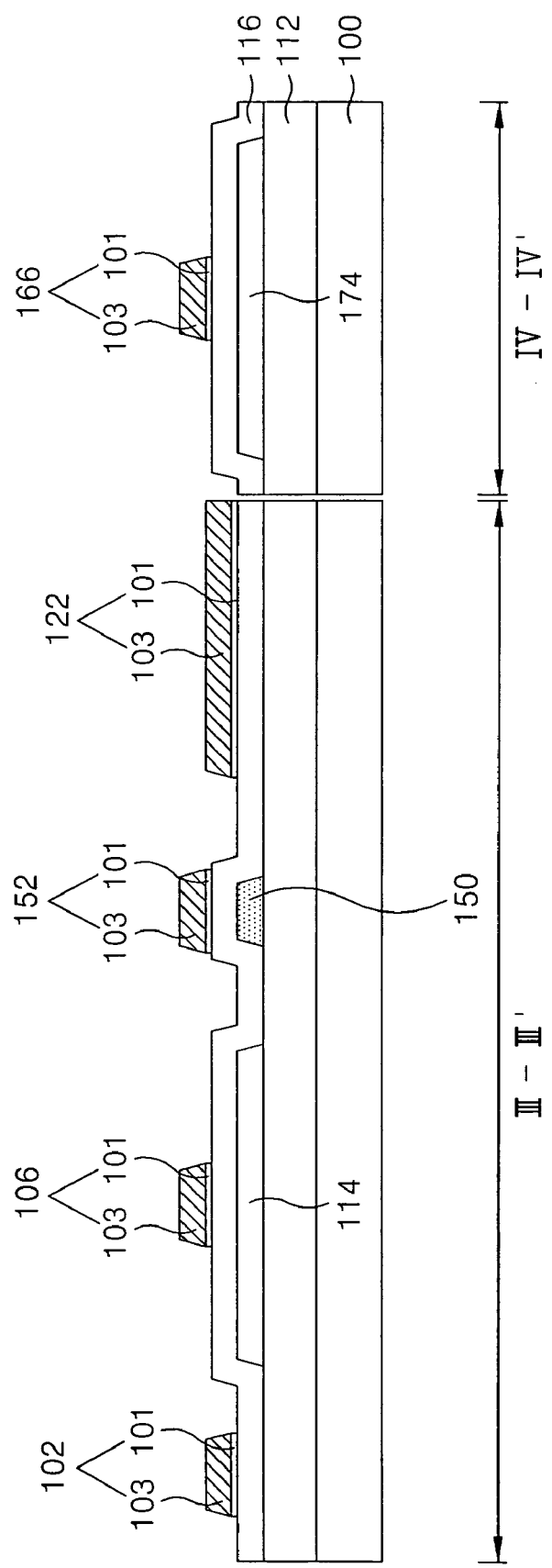

LIQUID CRYSTAL DISPLAY DEVICE AND METHOD OF FABRICATING THE SAME

This application claims the benefit of Korean Patent Application No. P2004-118561, filed on Dec. 31, 2004, which is hereby incorporated by reference for all purposes as if fully set forth herein.

BACKGROUND OF THE INVENTION

1. Field of the Invention

This invention relates to a poly-silicon display device, and more particularly to a poly-silicon liquid crystal display and a simplified method of fabricating the same.

2. Discussion of the Related Art

Generally, a liquid crystal display (LCD) device, which includes a plurality of liquid crystal cells in a matrix configuration in a liquid crystal display panel, displays images by controlling the transmittance of light in accordance with video signals. In each liquid crystal cell, a thin film transistor (TFT) is used as a switching device to independently supply a video signal. An active layer of such a TFT is generally formed of either amorphous silicon or polycrystalline silicon (poly-silicon). Because the carrier mobility of poly-silicon is approximately hundred times faster than the carrier mobility of amorphous silicon, high-speed driving circuits can be integrally formed in the LCD panel with the poly-silicon technology.

FIG. 1 is a schematic view illustrating a TFT substrate of a poly-silicon liquid crystal display panel integrated with driving circuits according to the related art.

Referring to FIG. 1, the TFT substrate includes a display area 7 provided with a TFT 30 and a pixel electrode 22 in each pixel area defined by the crossings of gate lines 2 and data lines 4, a data driver 5 for driving the data lines 4, and a gate driver 3 for driving the gate lines The TFT 30 charges a video signal from the data line 4 into the pixel electrode 22 in response to a scanning signal from the gate line 2. The pixel electrode 22 charged with the video signal generates a potential difference with respect to a common electrode of a color filter substrate which faces the TFT substrate with liquid crystal therebetween. This potential difference rotates the molecules of the liquid crystal due to the dielectric anisotropy of the liquid crystal. The transmittance of light varies depending on an amount of rotation of the liquid crystal molecules, thereby implementing gray-scale levels.

The gate driver 3 sequentially drives the gate lines 2, and the data driver 5 applies video signals to the data lines 4 when one of the gate lines 2 is driven.

FIG. 2 is an enlarged plan view of one pixel area included in the display area 7 of the TFT substrate illustrate in FIG. 1, and FIG. 3 is a cross-sectional view of the pixel area of the TFT substrate taken along the line I-I' in FIG. 2.

Referring to FIGS. 2 and 3, the TFT substrate includes the thin film transistor (TFT) 30 connected to the gate line 2 and the data line 4, and the pixel electrode 22 connected to the TFT 30. Although either an NMOS-TFT or PMOS-TFT can be used for the TFT 30, the TFT 30 employing an NMOS-TFT will now be described.

The TFT 30 has a gate electrode 6 connected to the gate line 2, a source electrode connected to the data line 4, and a drain electrode 10 connected to the pixel electrode 22 via a pixel contact hole 20 passing through a protective film 18. The gate electrode 6 overlaps a channel area 14C of an active layer 14 provided on a buffer film 12 with a gate insulating film 16 therebetween. The source electrode and the drain electrode 10 are formed in such a manner to be insulated from the gate electrode 6 with an interlayer insulating film 26 therebetween. Further, the source electrode and the drain electrode 10 are connected to a source area 14S and a drain area 14D of the active layer 14 doped with an $n^+$ impurity, respectively, via a source contact hole 24S and a drain contact hole 24D passing through the interlayer insulating film 26 and the gate insulating film 16.

The TFT substrate according to the related art has a problem in that the manufacturing process is complicated and the manufacturing cost is high.

SUMMARY OF THE INVENTION

Accordingly, the present invention is directed to a thin film transistor substrate of poly-silicon liquid crystal display device and method of fabricating the same that substantially obviates one or more of the problems due to limitations and disadvantages of the related art.

An advantage of the present invention is to provide a thin film transistor substrate of a poly-silicon liquid crystal display device and a simplified method of fabricating the same.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the present invention, as embodied and broadly described, a liquid crystal display device according to the present invention includes first and second substrates having a display region and a driver region; a first sealant overlapping the driver region; and a liquid crystal layer between the first and second substrates.

In another aspect of the present invention, a method of fabricating a liquid crystal display device includes providing first and second substrates having a display region and a driver region; forming a first sealant on at least one of the first and second substrates, the first sealant overlapping the driver region; and forming a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6A to FIG. 6G are cross-sectional views illustrating a method of fabricating a thin film transistor substrate of a poly-silicon display device according to an embodiment of the present invention;

DETAILED DESCRIPTION OF THE ILLUSTRATED EMBODIMENTS

Reference will now be made in detail to embodiments of the present invention, examples of which are illustrated in the accompanying drawings.

Figure 1:
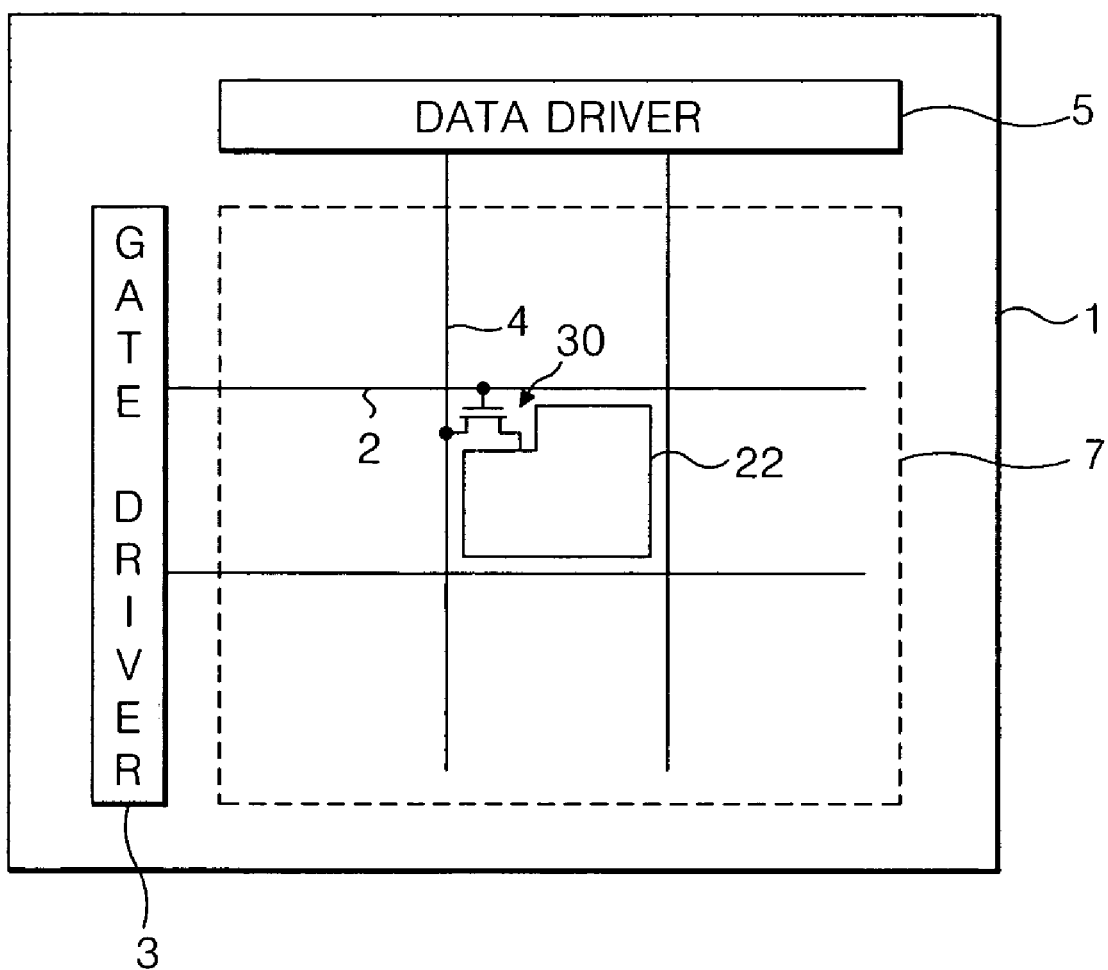
FIG. 1 is a schematic view illustrating a TFT substrate of a poly-silicon liquid crystal display panel integrated with driving circuits according to the related art.
Figure 2:
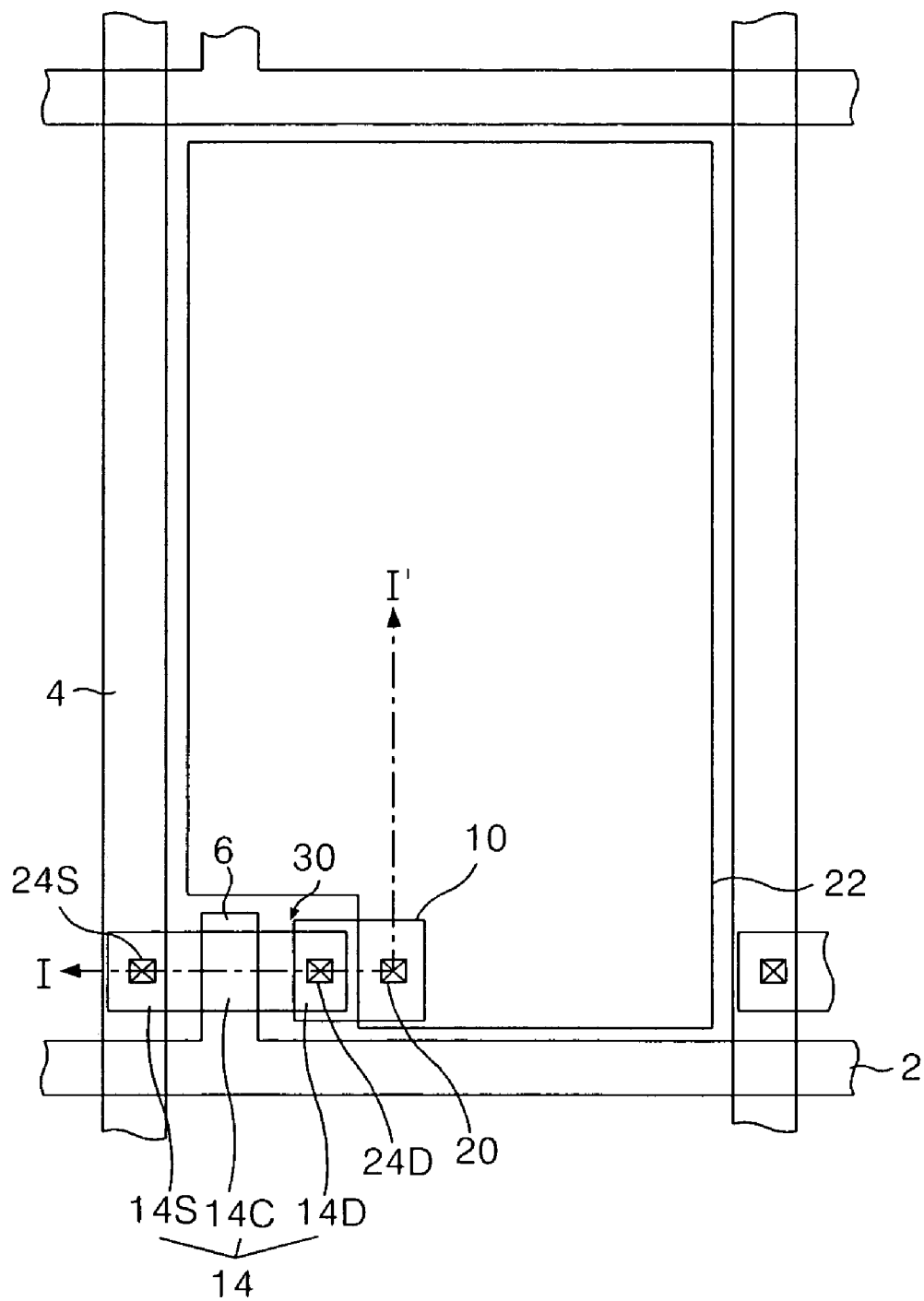
FIG. 2 is an enlarged plan view of one pixel area included in the display area 7 of the TFT substrate illustrate in FIG. 1.
Figure 3:
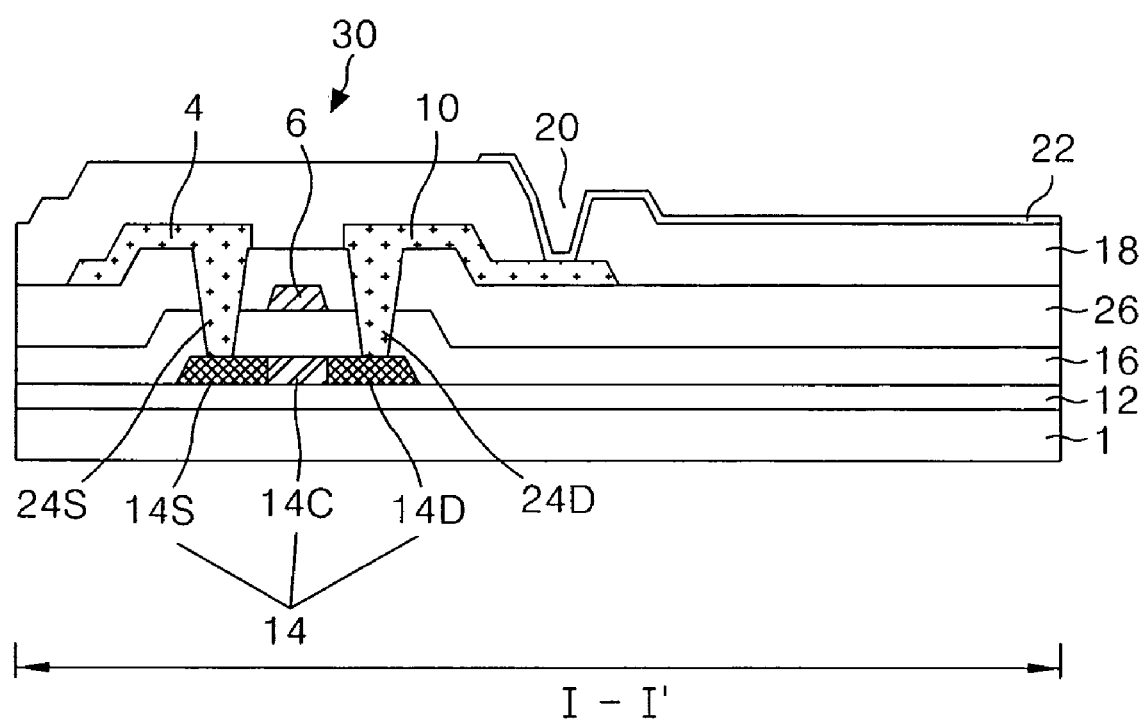
FIG. 3 is a cross-sectional view of the pixel area of the TFT substrate taken along the line I-I' in FIG. 2.
Figure 4:
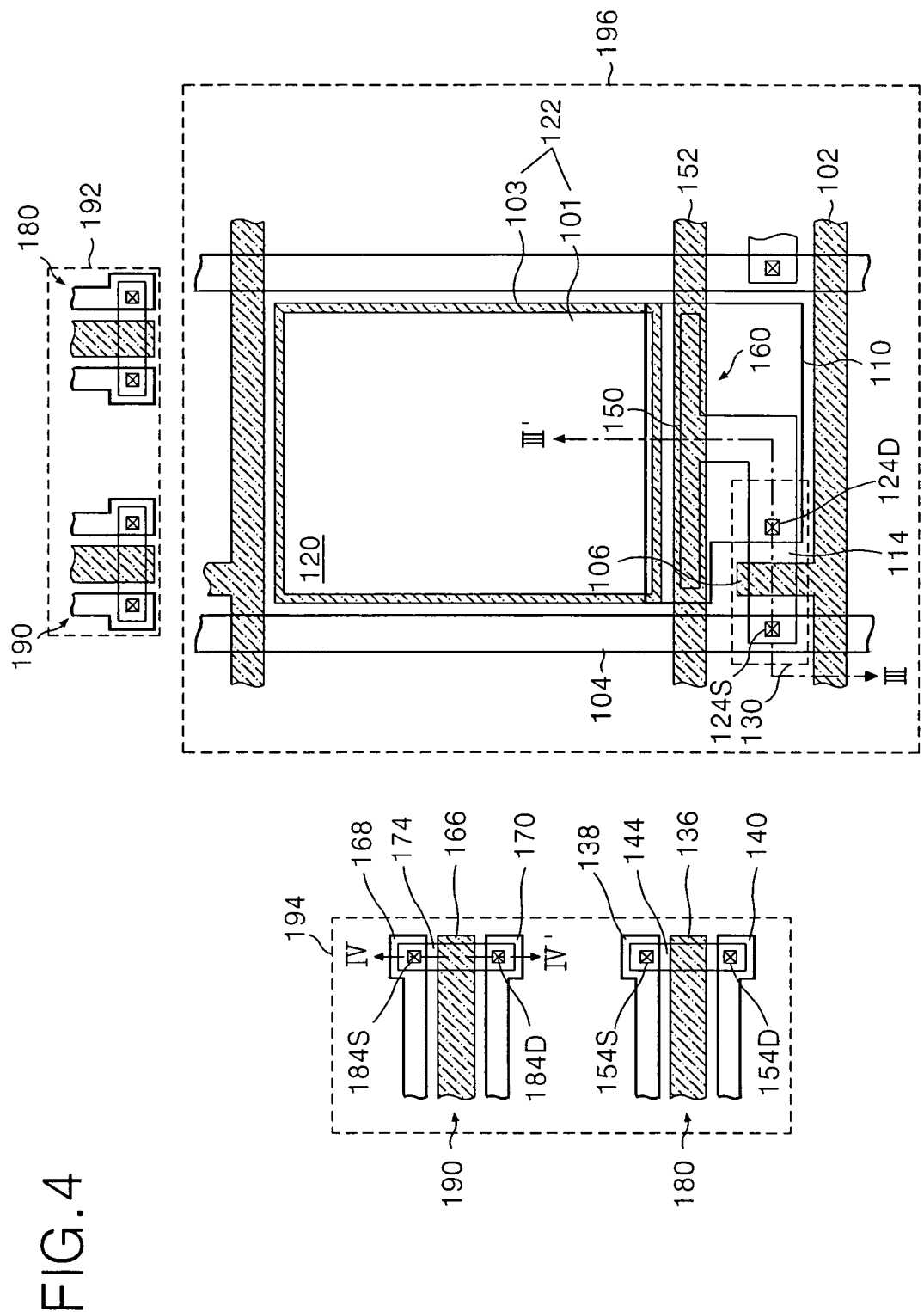
FIG. 4 is a plan view illustrating a portion of a thin film transistor substrate of a poly-silicon display device according to an embodiment of the present invention.
Figure 5:
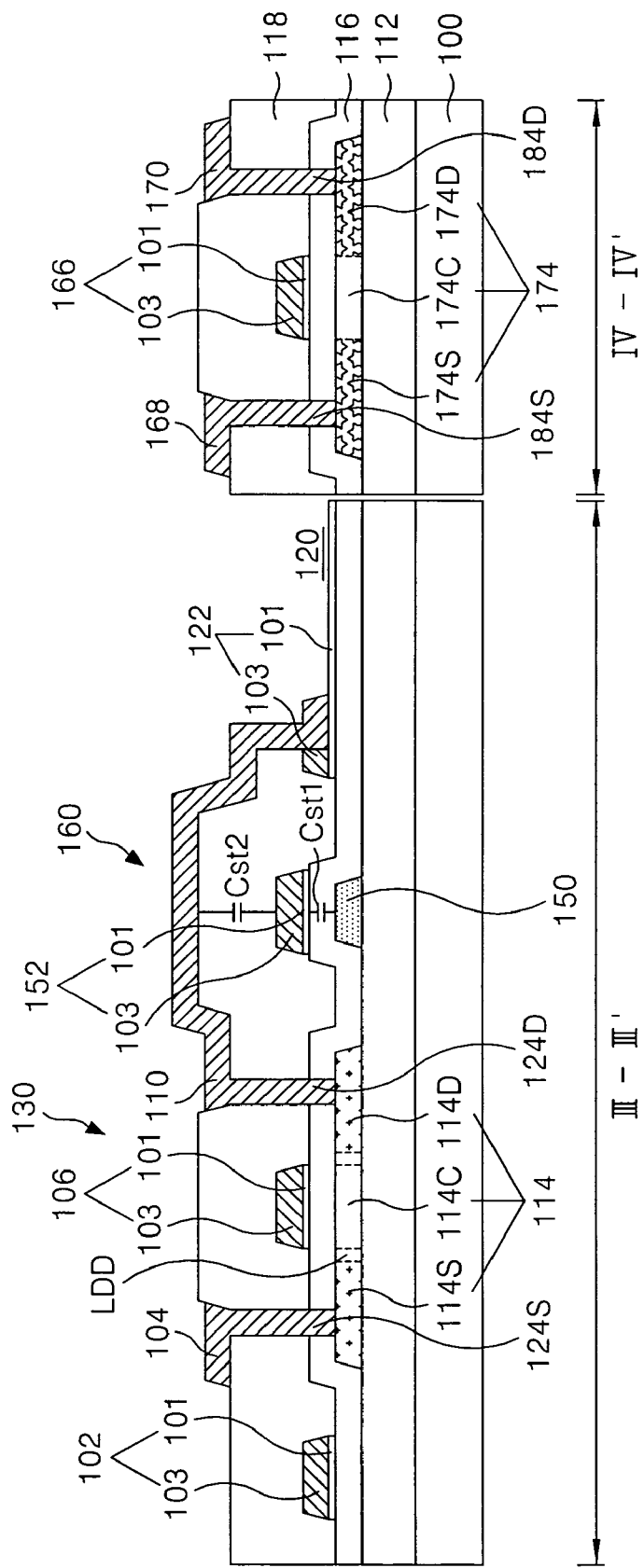
FIG. 5 is a cross-sectional view of the thin film transistor substrate taken along the lines III-III', IV-IV' and V-V' in FIG. 4.

FIG. 4 is a plan view illustrating a portion of a thin film transistor substrate of a poly-silicon liquid crystal display device according to an embodiment of the present invention, and FIG. 5 is a cross-sectional view of the thin film transistor substrate taken along the lines III-III', IV-IV' and V-V' in FIG. 4.

Referring to FIGS. 4 and 5, the thin film transistor (TFT) substrate includes a display area 196, a data driver 192 for driving data lines 104 of the display area 196, and a gate driver 194 for driving gate lines 102 of the display area 196.

The display area 196 includes a first TFT 130 connected to the gate line 102 and the data line 104, a pixel electrode 122 connected to the TFT 130, and a storage capacitor 160. Although the first TFT 130 can be either an NMOS-TFT or PMOS-TFT, the first TFT 130 employing an NMOS-TFT will now be described.

The data line 104 crosses the gate line 102 and a storage line 152 with an interlayer insulating film 118 therebetween to define a pixel area provided with the pixel electrode 122.

The first NMOS-TFT 130 applies a video signal on the data line 104 to the pixel electrode 122 in response to a gate signal from the gate line 102. To this end, the first NMOS TFT 130 includes a first gate electrode 106 connected to the gate line 102, a first source electrode connected to the data line 104, a first drain electrode 110 connected to the pixel electrode 122, and a first active layer 114 for defining a channel between the first source electrode and the first drain electrode 110.

The gate line 102 and the first gate electrode 106, along with the storage line 152, have a double-layer structure in which a metal layer 103 is formed on a transparent conductive layer 101.

The first active layer 114 is formed on a lower substrate 100 with a buffer film 112 therebetween. The first active layer 114 has a channel area 114C overlapping the gate electrode 106 with a gate insulating film 116 therebetween, and a source area 114S and a drain area 114D doped with an n+impurity. The source area 114S and the drain area 114D of the first active layer 114 are connected to the first source electrode and the first drain electrode 110, respectively, via a first source contact hole 124S and a first drain contact hole 124D passing through the interlayer insulating film 118 and the gate insulating film 116. The first active layer 114 may further include a lightly doped drain (LDD) area (not shown) doped with an n⁻ impurity between the channel area 114C and the source and drain areas 114S and 114D so as to reduce the off current of the first NMOS-TFT 130.

The pixel electrode 122 includes a transparent conductive layer 101 provided on the gate insulating film 116 in the pixel area, and a metal layer 103 on the transparent conductive layer 101 along a periphery of the transparent conductive layer 101. In other words, the transparent conductive layer 101 of the pixel electrode 122 is exposed through a transmitting hole 120 passing through the interlayer insulating film 118 and the metal layer 103. Alternatively, the pixel electrode 122 may only include the transparent conductive layer 101 without the metal layer 103. The pixel electrode 122 crosses the storage line 152 and is connected to the first drain electrode 110 extended along a side surface of the transmitting hole 120. More specifically, the first drain electrode 110 is connected to the metal layer 103 and the transparent conductive layer 101 of the pixel electrode 122 exposed through the transmitting hole 120.

The TFT 130 charges a video signal into the pixel electrode 122 to generate a potential difference with respect to a common electrode of a color filter substrate (not shown). This potential difference rotates liquid crystal provided between the TFT substrate and the color filter substrate due to the dielectric anisotropy of the liquid crystal, thereby controlling an amount of transmitted light inputted from a light source (not shown) via the pixel electrode 122 toward the color filter substrate.

The storage capacitor 160 includes first and second storage capacitors Cst1 and Cst2 connected in parallel between the storage line 152 and the TFT 130. The first storage capacitor Cst1 is provided such that the storage line 152 overlaps the lower storage electrode 150 extended from the active layer 114 with the gate insulating film 116 therebetween. The second storage capacitor Cst2 is provided such that the drain electrode 110 crosses the storage line 152 with the interlayer insulating film 118 therebetween. Because the storage capacitor 160 includes the first and second storage capacitors Cst1 and Cst2 connected in parallel, it has a high capacitance value. The storage capacitor 160 stably maintains a video signal charged in the pixel electrode 122 during a predetermined period of time.

The gate driver 194 and the data driver 192 has a CMOS structure including a second NMOS-TFT 180 and a PMOS-TFT 190.

The second NMOS-TFT 180 includes a second active layer 144 provided on the buffer film 112, a second gate electrode 136 overlapping a channel area of the second active layer 144 with the gate insulating film 116 therebetween, and a second source electrode 138 and a second drain electrode 140 connected to source and drain areas of the second active layer 144, respectively, via a second source contact hole 154S and a second drain contact hole 154D. The second active layer further includes a channel area, and a lightly doped drain (LDD) area (not shown) doped with an n⁻ impurity between the channel area 114C and the source and drain areas so as to reduce the off current. The second NMOS-TFT 180 has the same structure as the first NMOS-TFT 130 in the display area 196.

The PMOS-TFT 190 includes a third active layer 174 provided on the buffer film 112, a third gate electrode 166 overlapping a channel area 174C of the third active layer 174 with the gate insulating film 116 therebetween, and a third source electrode 168 and a third drain electrode 170 connected to a source area 174S and a drain area 174D of the third active layer 174, respectively, via a third source contact hole 184S and a third drain contact hole 184D. The source area 174S and the drain area 174D of the third active layer 174 are doped with a p-type impurity.

As described above, in the TFT substrate of the poly-silicon display device according to the embodiment of the present invention, the pixel electrode 122, along with a double-layer structure of the gate line 102, the first to third gate electrodes 106, 136 and 166 and the storage line 152, etc., is formed on the gate insulating film 116, thereby simplifying the manufacturing process. As a result, a source/drain metal pattern including the data line 104 having the first source electrode, the second and third source electrodes 138 and 168 and the first to third drain electrodes 110, 140 and 170 has an exposed structure. However, according to the principles of the present invention, the source/drain pattern can be protected by an alignment film or the liquid crystal by positioning the source/drain pattern inside an area sealed by a sealant.

FIG. 6A to FIG. 6G are cross-sectional views illustrating a method of fabricating a TFT substrate of a poly-silicon display device according to an embodiment of the present invention. In the drawings, the second NMOS-TFT 180 included in the gate driver 194 and the data driver 192 is not shown because it has the same structure as the first NMOS-TFT 130 of the display area 196, but it will be described with reference to FIG. 4.

Figure 6A:
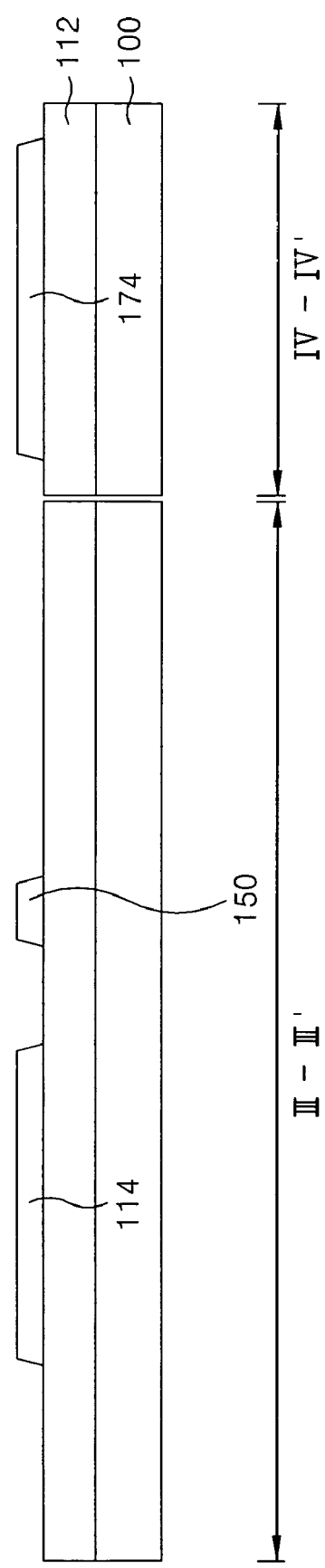

Referring to FIG. 6A, the buffer film 112 is formed on the lower substrate 100, and then the first active layers 114 and the lower storage electrode 150 are formed thereon in the display area and the second and third active layers 144 and 174 are formed in the driver area by a first mask process.

To form the buffer film 112, an inorganic insulating film such as $SiO_2$, etc. is entirely deposited on the lower substrate 100. Next, an amorphous-silicon thin film is formed on the buffer film 112 by a low pressure chemical vapor deposition (LPCVD) technique or a plasma enhanced chemical vapor deposition (PECVD) technique, etc. and then is crystallized to form a poly-silicon thin film. A dehydrogenization process may be performed to reduce hydrogen atoms existing in the amorphous-silicon thin film prior to the crystallization of the amorphous-silicon thin film. A laser annealing (ELA) technique such as the sequential lateral solidification (SLS) can be employed to crystallize the amorphous-silicon thin film, where grains grow in a horizontal direction to enlarge a size of the grains. The poly-silicon thin film is patterned by photolithography and etching processes using a first mask to form the first active layer 114 and the lower storage electrode 150 in the display area and the second and third active layers 144 and 174 in the driver area.

Figure 6B:
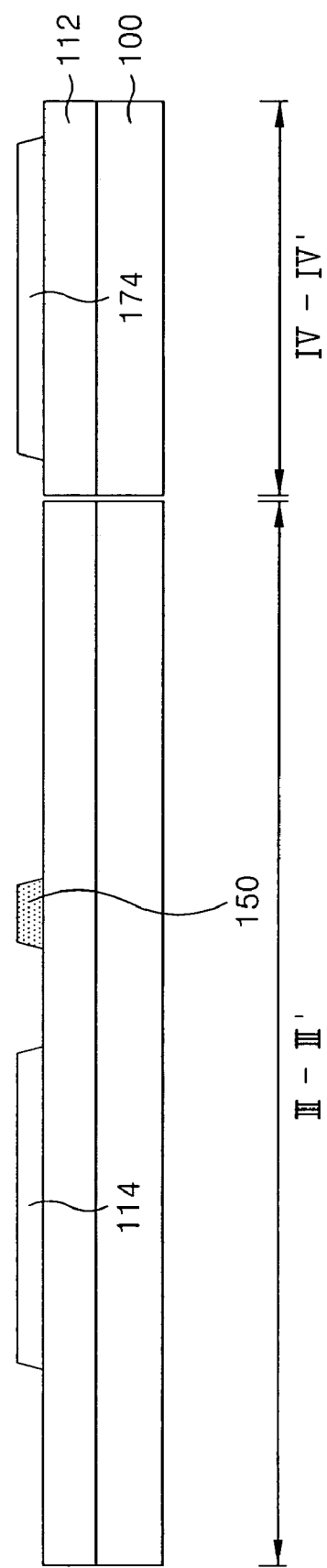

Referring to FIG. 6B, an $n^+$ impurity is doped into the lower storage electrode 150 to have a conductivity by a second mask process.

More specifically, a photo-resist pattern exposing the lower storage electrode 150 is formed by a photolithography process using a second mask, and an n+impurity is doped into the lower storage electrode 150, thereby allowing the lower storage electrode 150 to have a conductivity. Then, the photo-resist pattern is removed by a stripping process.

Referring to FIG. 6C, the gate insulating film 116 is formed on the buffer film 112 provided with the first to third active layers 114, 144 and 174 and the lower storage electrode 150, and the pixel electrode 122, along with a double-layer structure of the gate line 102, the first to third gate electrodes 106, 136 and 166 and the storage line 152, is formed thereon by a third mask process.

The gate insulating film 116 is formed by entirely depositing an inorganic insulating film such as $SiO_2$, etc. on the buffer film 112 provided with the first to third active layers 114, 144 and 174 and the lower storage electrode 150. Then, the transparent conductive layer 101 and the metal layer 103 are sequentially formed on the gate insulating film 116 by the sputtering, etc. The transparent conductive layer 101 is formed of indium-tin-oxide (ITO), tin-oxide (TO) or indium-zinc-oxide (IZO), etc., whereas the gate metal layer 103 has at least a single layer formed of a metal material such as Mo, Cu, AlNd, Al, Ti, Cr, a Mo alloy, a Cu alloy or an Al alloy, etc. Next, the metal layer 103 and the transparent conductive layer 101 are patterned by photolithography and etching processes using a third mask to form the pixel electrode 122 along with the double-layer structure of the gate line 102, the first to third gate electrodes 106, 136 and 166 and the storage line 152.

Figure 6D:
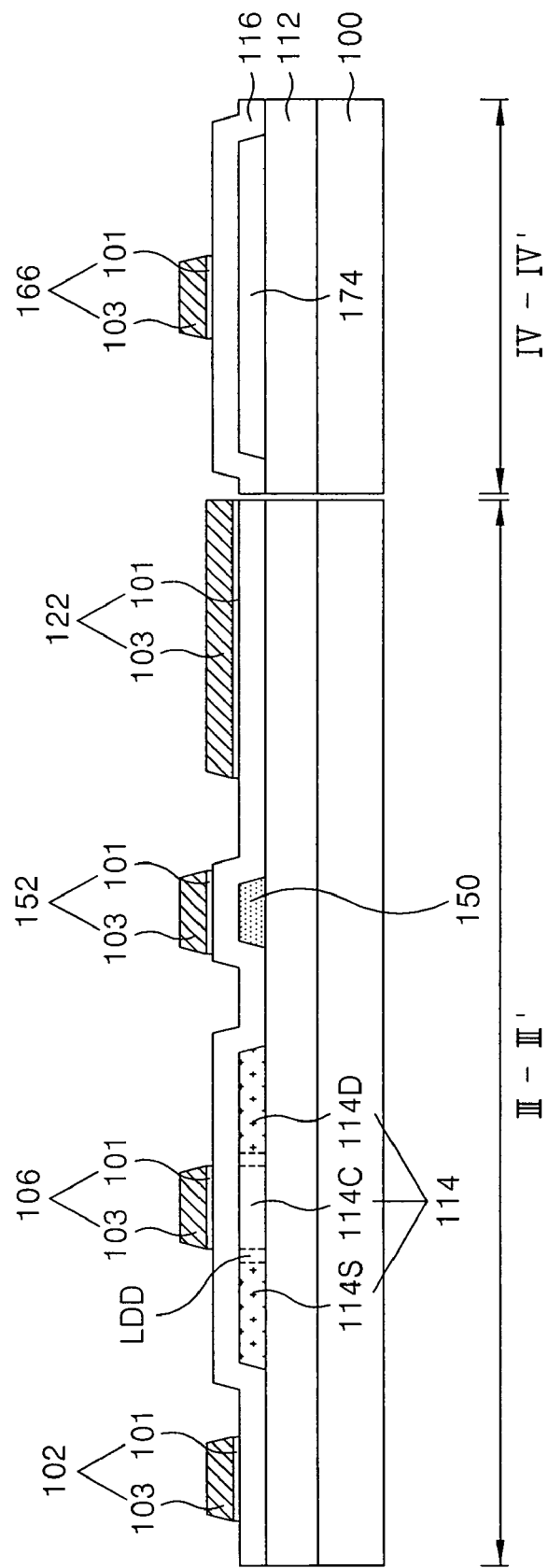

Referring to FIG. 6D, the source area 114S and the drain area 114D of the first and second active layers 114 and 144 and an LDD area are defined by a fourth mask process.

More specifically, an $n^-$ impurity is doped into exposed portions of the first and second active layers 114 and 144 to define the LDD area using the first and second gate electrodes 106 and 136 as a mask. Subsequently, the photo-resist pattern exposing the source area 114S and the drain area 114D of the first and second active layers 114 and 144 is formed by a photolithography process using a fourth mask, and an $n^+$ type impurity is doped into the source and drain areas 114S and 114D. The source and drain areas 114S and 114D of the first and second active layers 114 and 144 are positioned between the channel area 114C overlapping the gate electrodes 106 and 136 and the LDD area doped only with an $n^-$ impurity. Then, the photo-resist pattern is removed by a stripping process.

Figure 6E:
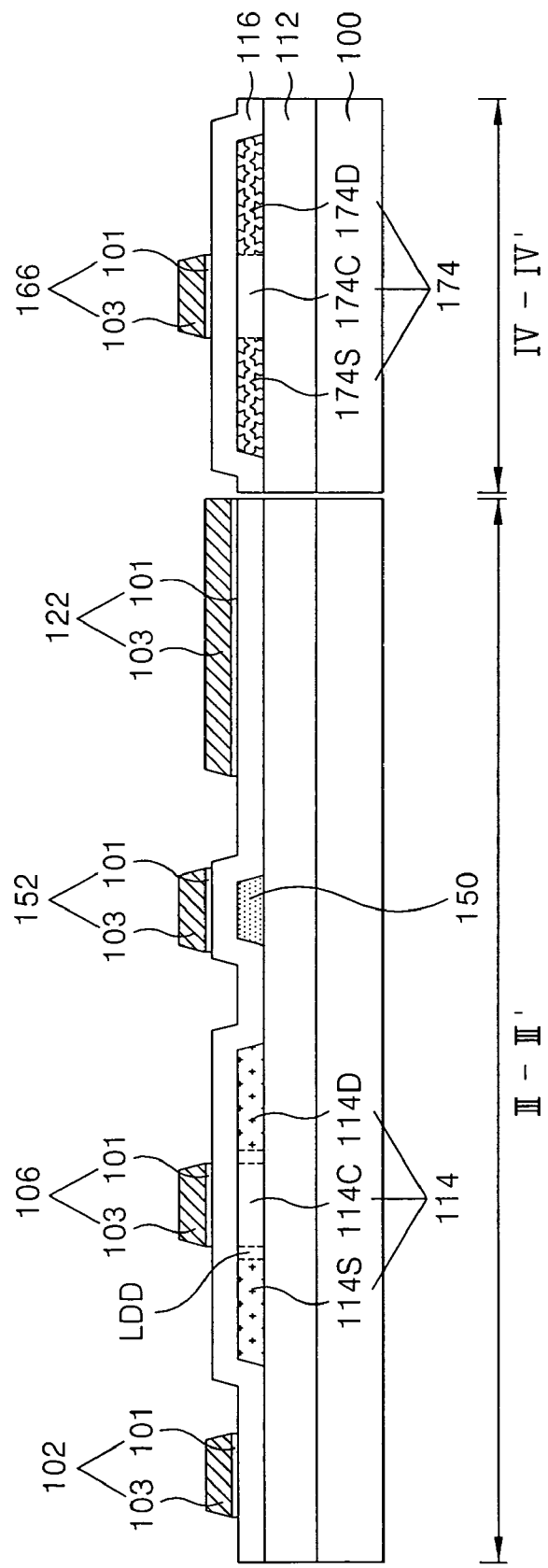

Referring to FIG. 6E, a $p^+$ type impurity is doped into the third active layer 174 to form the source area 174S and the drain area 174D of the third active layer 174 by a fifth mask process.

More specifically, a photo-resist pattern exposing the source area 174S and the drain area 174D of the third active layer 174 is provided by a photolithography process using a fifth mask. A p+ type impurity is doped into each side area of the exposed third active layer 174 to thereby form the source area 174S and the drain area 174D of the third active layer 174. The source and drain areas 174S and 174D of the third active layer 174 are opposed to each other with the channel area 174C overlapping the third gate electrode 166 therebetween. Then, the photo-resist pattern is removed by a stripping process.

Figure 6F:
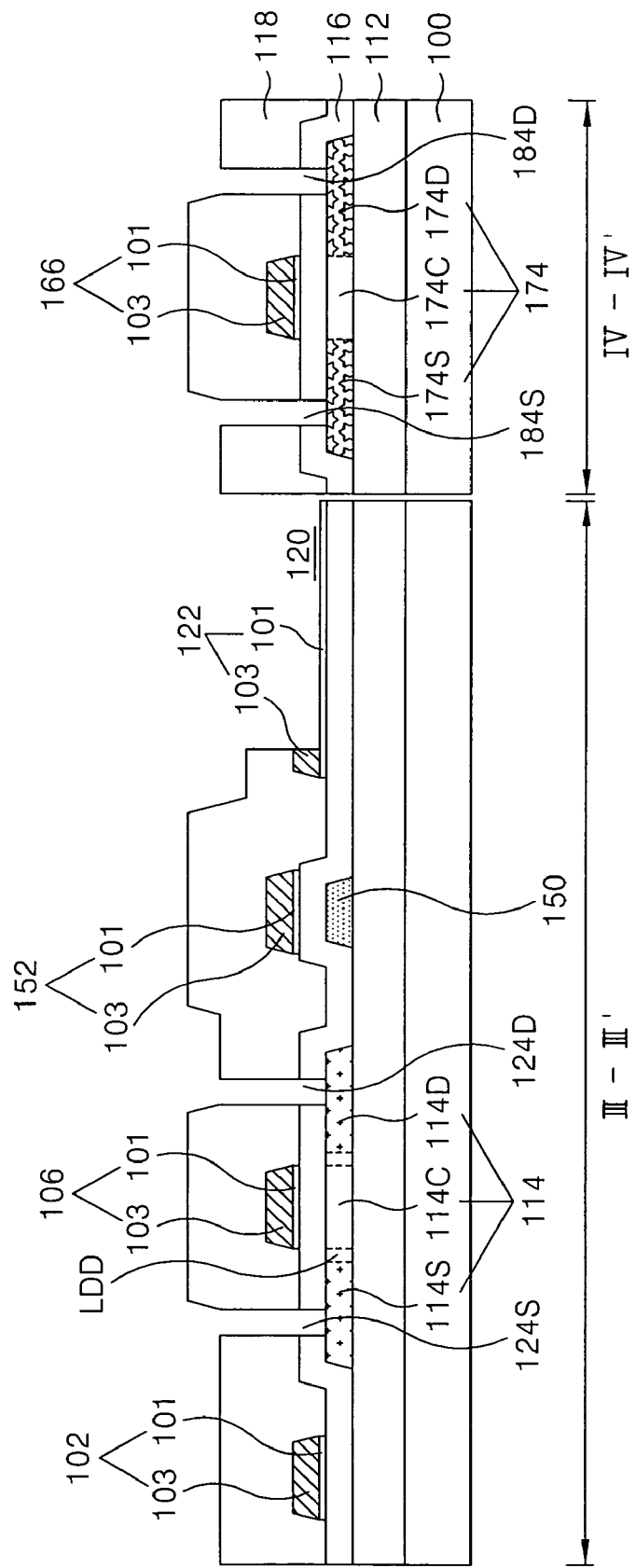

Referring to FIG. 6F, the interlayer insulating film 118 having the source and drain contact holes 124S, 124D, 154S, 154D, 184S and 184D and the transmitting hole 120 is formed on the gate insulating film 116 provided with the gate line 102, the gate electrodes 106, 136 and 166, the storage line 152 and the pixel electrode 122 by a sixth mask process.

The interlayer insulating film 118 is provided by entirely depositing an inorganic insulating material such as $SiO_x$ or $SiN_x$, etc. onto the gate insulating film 116 provided with the gate line 102, the gate electrodes 106, 136 and 166, the storage line 152 and the pixel electrode 122.

Then, the first to third source contact holes 124S, 154S and 184S and the first to third drain contact holes 124D, 154D and 184D passing through the interlayer insulating film 118 and the gate insulating film 116, and the transmitting hole 120 passing through the interlayer insulating film 118 are formed by photolithography and etching processes using a sixth mask. The first to third source contact holes 124S, 154S and 184S expose the source areas 114S, 144S and 174S of the first to third active layers 114, 144 and 174, respectively. The first to third drain contact holes 124D, 154D and 184D expose the drain areas 114D, 144D and 174D of the first to third active layers 114, 144 and 174. The transmitting hole 120 exposes the gate metal layer 103 that is a upper layer of the pixel electrode 122.

Subsequently, the gate metal layer 103 of the pixel electrode 122 exposed through the transmitting hole 120 is etched to expose the transparent conductive layer 101. The gate metal layer 103 overlapping the interlayer insulating film 118 remains at a periphery of the transparent conductive layer 101.

Figure 6G:
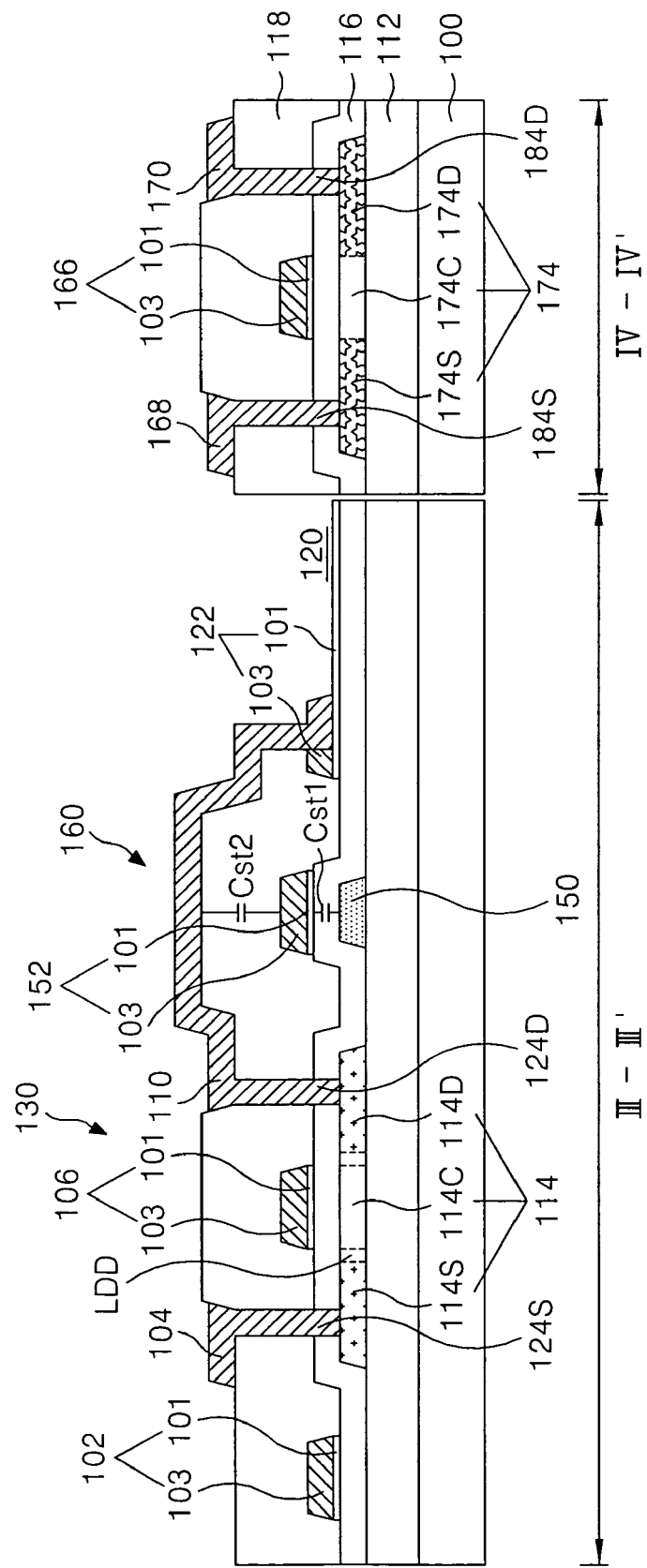

Referring to FIG. 6G, a source/drain metal pattern including the data line 104 having the first source electrode, the second and third source electrodes 138 and 168 and the first to third drain electrodes 110, 140 and 170 are formed on the interlayer insulating film 118 by a seventh mask process.

The source/drain metal pattern is formed by depositing a source/drain metal layer on the interlayer insulating film 118 and then patterning the source/drain metal layer by photolithography and etching processes using a seventh mask. The data line 104 and the first drain electrode 110 are connected to the source and drain areas 114S and 114D of the first active layer 114 via the first source and drain contact holes 124S and 124D. Further, the first drain electrode 110 is connected to the pixel electrode 122 via the transmitting hole 120 in such a manner to overlap the storage line 152. The second source and drain electrodes 138 and 140 are connected to the source and drain areas of the second active layer 144, respectively, via the second source and drain contact holes 154S and 154D. The third source and drain electrodes 168 and 170 are connected to the source and drain areas 174S and 174D of the third active layer 174 via the third source and drain contact holes 184S and 184D.

As described above, the method of fabricating the TFT substrate of the poly-silicon display device according to the embodiment of the present invention is a simplified seven-mask process. The TFT substrate according to the embodiment of the present invention does not include a protective layer and thus the source/drain metal pattern is exposed. However, when all of the source/drain metal patterns are located inside an area sealed by a sealant, they can be sufficiently protected by an alignment film formed thereon as well as the liquid crystal in the sealed area.

Figure 7:
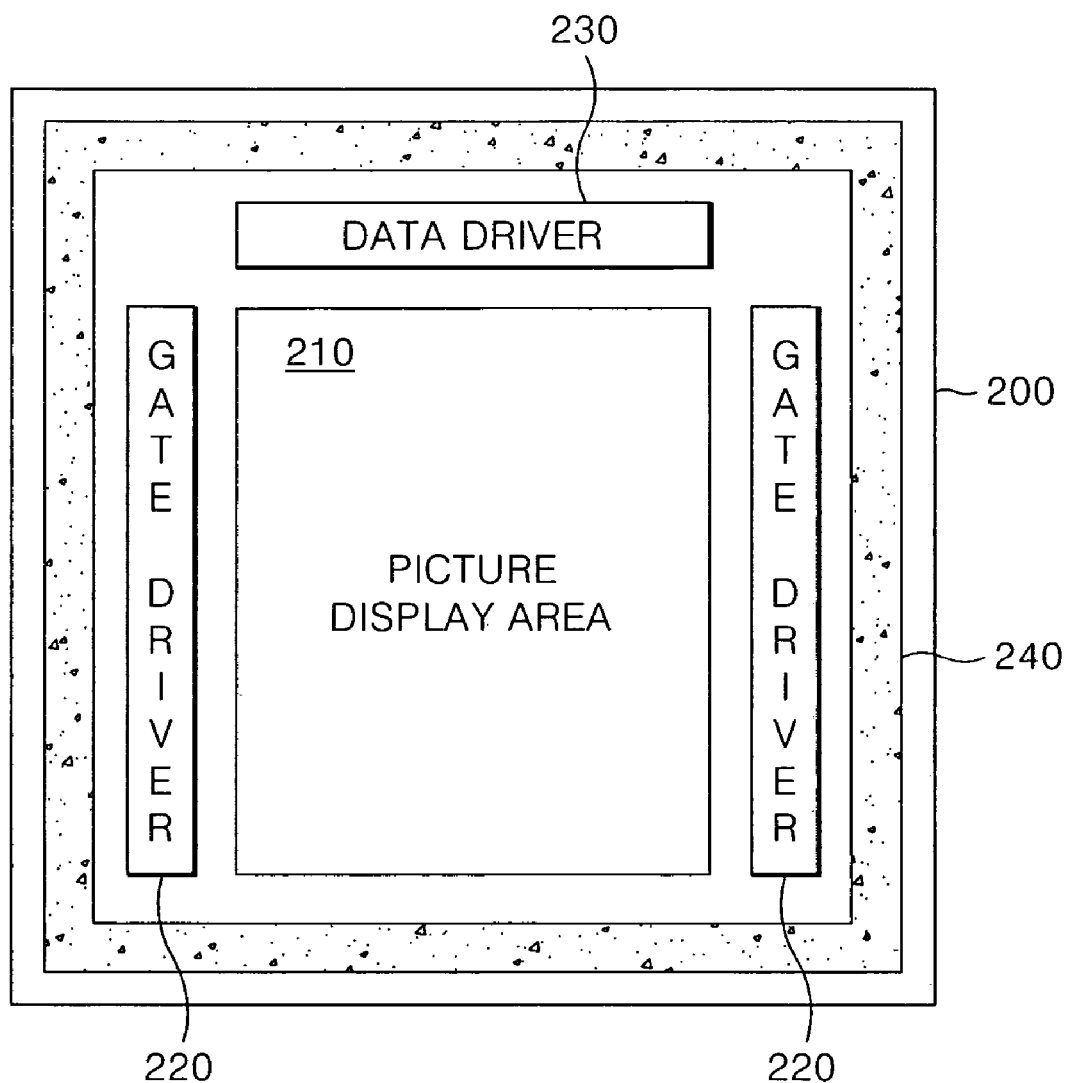
FIG. 7 is a schematic view illustrating a poly-silicon liquid crystal display panel according to an embodiment of the present invention.

FIG. 7 is a schematic view illustrating a poly-silicon liquid crystal display (LCD) panel according to an embodiment of the present invention.

The LCD panel includes a display area 210, a data driver 230 for driving data lines of the display area 210, and a gate driver 220 for driving gate lines of the display area 210.

The display area 210 includes a TFT and a pixel electrode in each pixel area defined by the crossings of the gate lines and the data lines. The TFT charges a video signal from the data line into the pixel electrode in response to a scanning signal from the gate line. The pixel electrode charged with the video signal generates a potential difference with respect to a common electrode of a color filter substrate which faces the TFT substrate with liquid crystal therebetween. This potential difference rotates the molecules of the liquid crystal due to the dielectric anisotropy of the liquid crystal. The transmittance of light varies depending on an amount of rotation of the liquid crystal molecules, thereby implementing gray-scale levels.

The gate driver 220 sequentially drives the gate lines, and the data driver 230 applies video signals to the data lines when one of the gate lines is driven.

Such an LCD panel is manufactured by attaching the TFT substrate to a color filter substrate using a sealant 240 and providing liquid crystal in a cell gap between the two attached substrates. The liquid crystal can be provided between the two substrates either by a liquid crystal dropping method in which the liquid crystal is dropped on at least one of the two substrates and then the two substrates are attached to each other or by a vacuum injection method in which the two substrates are attached to each other and then the liquid crystal is injected into the cell gap formed between the two substrates.

The TFT substrate is provided with the gate driver 220 and the data driver 230 along with the gate line, the data line, the TFT and the pixel electrode, etc. included in the display area 210. The color filter substrate is provided with a color filter, a black matrix and a common electrode. The sealant 240 is formed along peripherals of the gate driver 220 and the data driver 230 to attach the TFT substrate to the color filter substrate. Thus, the gate driver 220 and the data driver 230 are positioned inside an area sealed by the sealant 240.

Figure 8:
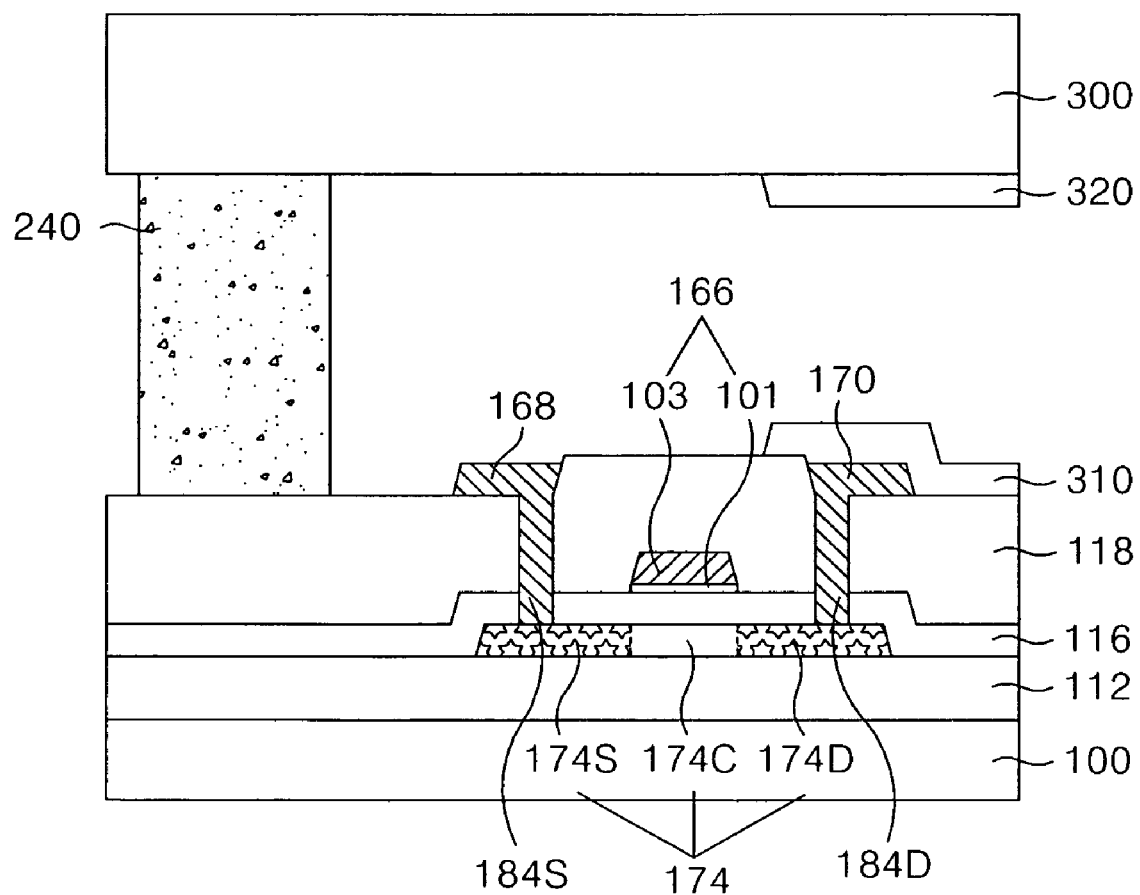
FIG. 8 is a cross-sectional view illustrating a portion of the driver area in the poly-silicon liquid crystal display panel illustrated in FIG. 7.

More specifically, a TFT included in the gate driver 220 or the data driver 230, for example, the PMOS-TFT 190 illustrated in FIG. 5, is positioned inside an area sealed by the sealant 240 in such a manner to be spaced from the sealant 240, as illustrated in FIG. 8. To increase the adhesiveness, the sealant 240 is spaced from upper and lower alignment films 310 and 320 formed of an organic insulating film and is not in contact with them on each of the TFT substrate and the color filter substrate 300, as illustrated in FIG. 8. Thus, the PMOS-TFT 190 provided on the TFT substrate has a structure in which one portion thereof overlaps the lower alignment film 310, while the other portion thereof does not overlap the lower alignment film 310. As a result, some electrodes of the PMOS-TFT 190, for example, a source electrode 168 has an exposed structure that causes an illumination problem or a short circuit between the upper and lower substrates, etc.

In order to solve these problems, a poly-silicon LCD panel according another embodiment of the present invention further includes a second sealant 250 in the driver area.

Figure 9:
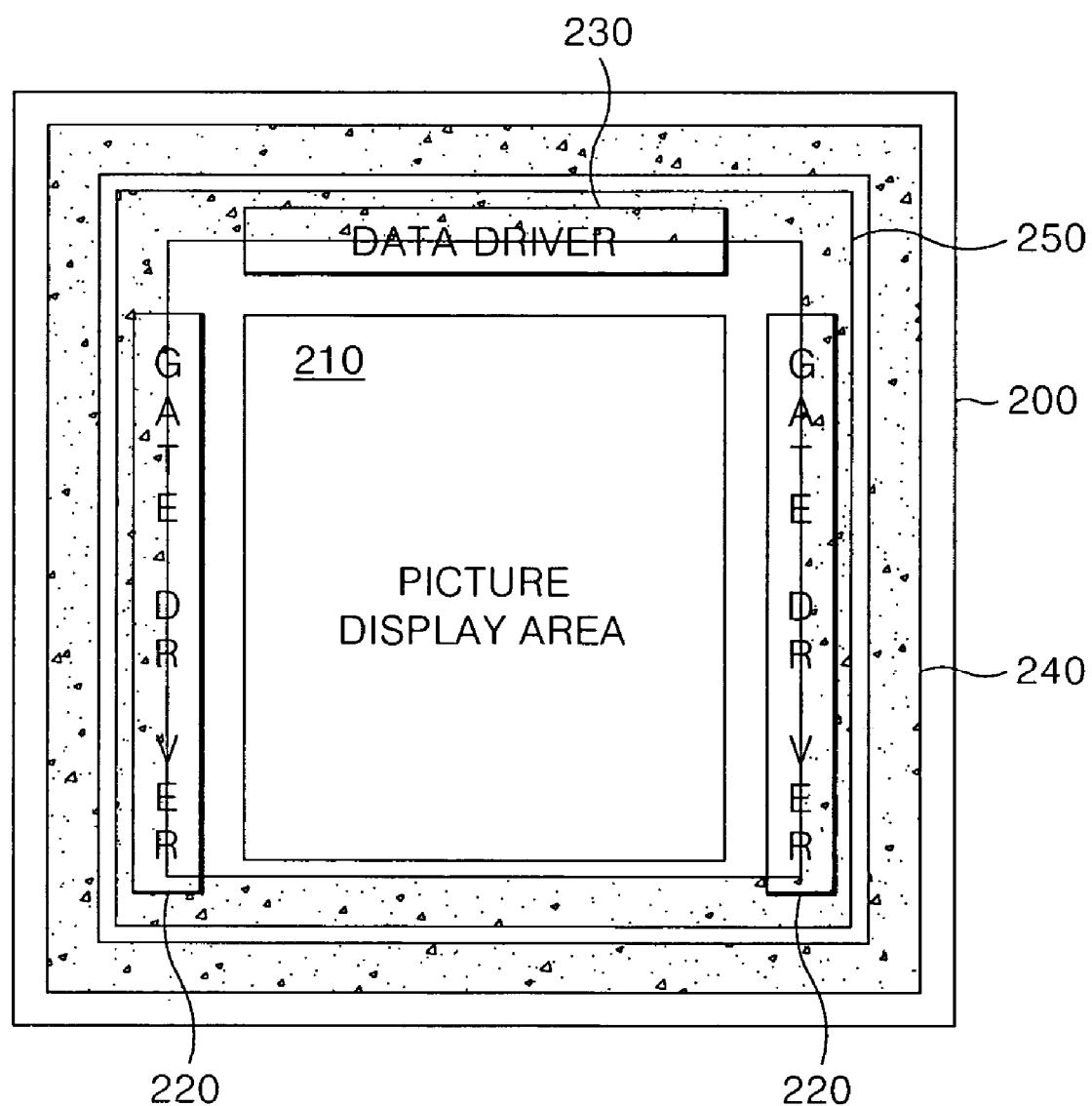
FIG. 9 is a schematic view illustrating a poly-silicon liquid crystal display panel according to another embodiment of the present invention.
Figure 10:
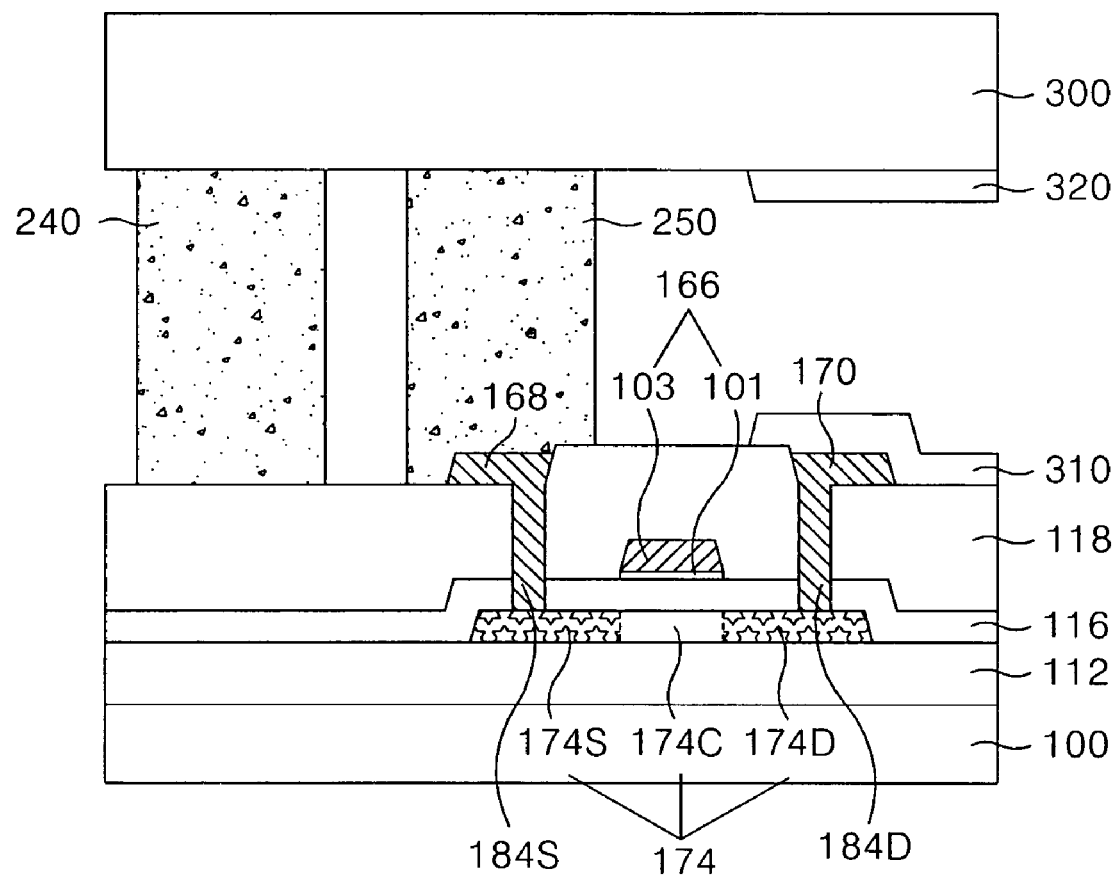
FIG. 10 is a cross-sectional view illustrating a portion of the driver area in the poly-silicon liquid crystal display panel illustrated in FIG. 9.

In FIGS. 9 and 10, a first sealant 240 is formed along peripherals of the gate driver 220 and the data driver 230, whereas the second sealant 250 is formed inside the first sealant 240 in such a manner to overlap the gate driver 220 and the data driver 230. Thus, the first and second sealants 240 and 250 are formed in two lines to attach the TFT substrate to a color filter substrate. The first sealant 240 is used to attach the TFT substrate to the color filter substrate, whereas the second sealant 250 protects the electrodes of TFTs included in the gate driver 220 and the data driver 230. Thus, the first sealant 240 may include glass fibers.

As illustrated in FIG. 10, the second sealant 250 overlaps the source electrode 168 of the PMOS-TFT 190 in the driver area to thereby protect the source electrode 168. The drain electrode 170 of the PMOS-TFT 190 is protected by the lower alignment film 310 or the second sealant 250. Because the second sealant 250 overlaps the source electrode 168 and/or the drain electrode 170 of the PMOS-TFT 190 included in the gate driver 220 and the data driver 30, it may not include glass fibers that may cause a breakage of the electrodes.

Thus, the source electrode 168 and the drain electrode 170 of the PMOS-TFT 190 included in the gate driver 220 and the data driver 230 can be sufficiently protected by the alignment film 310 and/or the second sealant 250 that does not contain glass fibers without a protective film.

As described above, a poly-silicon display device integrated with driving circuits according to the present invention can be manufactured by a simplified seven-mask process, thereby reducing the manufacturing cost and increasing the productivity. In addition, a poly-silicon display device integrated with driving circuits according to the present invention has two seal patterns, with one pattern enclosing the driving circuits and the other pattern overlapping the driving circuits. In particular, the seal pattern overlapping the driving circuits protects the thin film transistors inside the driving circuits and may not include glass fibers in order to prevent or minimize a breakage problem of the thin film transistors.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device, comprising:
    a first substrate having a display region in which a thin film transistor (TFT) is disposed and a driver region in which a gate driver and a data driver are disposed, wherein the gate driver and the data driver include at least one TFT, respectively;
    a second substrate opposite to the first substrate;
    a first sealant overlapping a portion of both the gate driver and data driver in the driver region;
    a liquid crystal layer between the first and second substrates;
    an alignment film in the display region and extended to the driver region, wherein the alignment film is spaced apart from the first sealant, and
    a second sealant enclosing a periphery of the driver region and spaced apart by a determined distance from the first sealant,
    wherein the first sealant only directly covers an exposed portion of a first electrode of the TFT in the driver region and the alignment film only directly covers an exposed portion of a second electrode of the TFT in the driver region.

2. The device of claim 1, wherein the alignment film is an uppermost layer of the first substrate.

3. The device of claim 1, wherein the TFT includes:
    an active layer on the first substrate;
    a gate electrode having a double-layer structure in which a metal layer is formed on a transparent conductive layer;
    a first insulating film between the active layer and the gate electrode; and
    a source electrode and a drain electrode connected to a source region and a drain region of the active layer.

4. The device of claim 3, wherein the gate electrode crosses the active layer.

5. The device of claim 3, wherein the first sealant protects at least one of the source and drain electrodes of the TFT in the driver region.

6. The device of claim 3, wherein the first substrate further includes:
    a pixel electrode connected to the drain electrode of the thin film transistor, the pixel electrode having the double-layer structure; and
    a second insulating film on the pixel electrode.

7. The device of claim 6, wherein the transparent conductive layer of the pixel electrode is exposed through a transmission hole passing through the second insulating film and the metal layer.

8. The device of claim 7, wherein the metal layer encloses the transmission hole.

9. A method of fabricating a liquid crystal display device, comprising:
    providing a first substrates having a display region in which a thin film transistor (TFT) is disposed and a driver region in which a gate driver and a data driver are disposed, wherein the gate driver and the data driver include at least one TFT, respectively;
    provide second substrate opposing to the first substrate;
    forming a first sealant on at least one of the first and second substrates, the first sealant overlapping a portion of both the gate driver and data driver in the driver region the driver region;
    forming a liquid crystal layer between the first and second substrates;
    forming an alignment film in the display region and extended to the driver region, wherein the alignment film is spaced apart from the first sealant; and
    forming a second sealant to enclose a periphery of the driver region and to be spaced apart by a determined distance from the first sealant,
    wherein the first sealant only directly covers an exposed portion of a first electrode of the TFT in the driver region and the alignment film only directly covers an exposed portion of a second electrode of the TFT in the driver region.

10. The method of claim 9, wherein the alignment film is an uppermost layer of the first substrate.

11. The method of claim 9, wherein forming the thin film transistor includes:
    forming an active layer on the first substrate;
    forming a first insulating film on the active layer;
    forming a gate electrode on the first insulating film, the gate electrode having a double-layer structure in which a metal layer is formed on a transparent conductive layer; and forming a source electrode and a drain electrode connected to a source region and a drain region of the active layer.

12. The method of claim 11, wherein the gate electrode crosses the active layer.

13. The method of claim 11, wherein the first sealant protects at least one of the source and drain electrodes of the thin film transistor in the driver region.

14. The method of claim 11, further comprising forming a pixel electrode connected to the drain electrode of the thin film transistor.

15. The method of claim 14, wherein the pixel electrode has the double-layer structure in the display region.

16. The method of claim 14, wherein forming the pixel electrode includes:
    forming a double conductive layer on the first insulating film;
    forming a second insulating film on the double conductive layer and forming a transmission hole passing through the second insulating film; and
    exposing the transparent conductive layer by etching a metal layer of the double conductive layer through the transmission hole.

17. The method of claim 16, wherein the metal layer encloses the transmission hole.

* * * * *